No. 627,670. Patented June 27, 1899.
C. H. JENKINS.
WATCH BARREL CONTRACTOR.
(Application filed Dec. 2, 1898.)

(No Model.)

WITNESSES:
A. D. Harrison
P. W. Pezzetti

INVENTOR:
Charles H. Jenkins
by Wright, Brown & Quinby
Attys.

THE NORRIS PETERS CO., PHOTO-LITHO., WASHINGTON, D. C.

UNITED STATES PATENT OFFICE.

CHARLES H. JENKINS, OF NEWARK, NEW JERSEY, ASSIGNOR OF ONE-HALF TO FRANK B. KENDRICK AND WILLIAM F. DAVIS, OF LEBANON, NEW HAMPSHIRE.

WATCH-BARREL CONTRACTOR.

SPECIFICATION forming part of Letters Patent No. 627,670, dated June 27, 1899.

Application filed December 2, 1898. Serial No. 698,045. (No model.)

*To all whom it may concern:*

Be it known that I, CHARLES H. JENKINS, of Newark, in the county of Essex and State of New Jersey, have invented certain new and useful Improvements in Barrel-Contractors, of which the following is a specification.

This invention has for its object to provide for the use of watchmakers a tool adapted for use in contracting the edges of a barrel to snap around a barrel-head on the arbor of a watch-mainspring, which tool shall be adapted to act on any of the various sizes of mainspring-barrels that are in use.

The invention consists in the improvements which I will now proceed to describe and claim.

Figure 1:
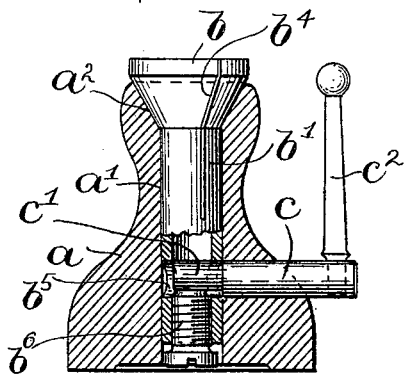
Figure 2:
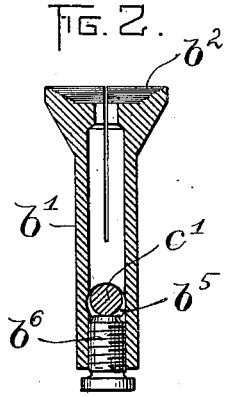
Figure 3:
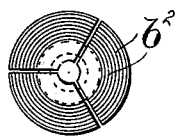

Of the accompanying drawings, forming a part of this specification, Figure 1 represents a sectional elevation of a chuck embodying my invention. Fig. 2 represents a sectional view of the sliding member of the chuck removed from the base. Fig. 3 represents an end view of the said sliding member.

The same letters of reference indicate the same parts in all the figures.

In the drawings, $a$ represents a base, which may be of any suitable form and is preferably provided at one end with a face or seat which enables it to rest securely upon a bench. A longitudinal socket $a'$ extends through the base $a$ and is provided at the outer or upper end of the same with a flaring or tapered mouth $a^2$. Longitudinally movable in the socket $a$ is a chuck composed of an outer end or head $b$ and a stem $b'$. The head $b$ is externally tapered to fit the mouth $a^2$, and its outer face is recessed and provided with a plurality of concentric steps or shoulders $b^2$. The head is split by means of two or more longitudinal slits $b^4$, which intersect the shoulders $b^2$, as shown in Fig. 3. The stem $b'$ is provided with an orifice $b^5$, which receives a cam $c'$, formed on a rock-shaft or stud $c$, journaled in a bearing formed in the base $a$. The cam is arranged so that when the rock-shaft is turned in one direction it will draw the stem $b'$ and head $b$ inwardly, thus causing the tapering mouth $a^2$ to compress the head $b$ and cause the shoulders $b^2$ to grasp and bend inwardly the inner end of a mainspring-barrel that may have been engaged with any of said shoulders. The stem $b'$ is provided with an adjustable step $b^6$, which receives the pressure of the cam when the latter is moved to draw the chuck inwardly, as last described, the adjustability of said step enabling the wear of the cam and the step to be compensated for. The step is here shown as composed of a screw engaged with a tapped orifice in the stem $b'$.

The rock-shaft $c$ is provided with an operating arm or handle $c^2$.

It will be seen that the plurality of shoulders $b^2$ enables the chuck to grasp and contract mainspring-barrels of various sizes.

The device is simple and durable and is made particularly desirable by the adjustable step $b^6$.

I claim—

A tool of the character described, comprising a base having a longitudinal socket, the outer end of which is flared or tapered, a chuck having a split tapering head internally recessed and stepped, and a stem having an orifice and an adjustable stop projecting into the orifice, and a rock-shaft or stud journaled in the base and having a cam located within said orifice and engaged with the said adjustable stop.

In testimony whereof I have affixed my signature in presence of two witnesses.

CHARLES H. JENKINS.

Witnesses:
ALBERT S. KOENIG,
RICHARD PEELS.